United States Patent [19]

Raden

[11] 3,816,339

[45] June 11, 1974

[54] URETHANE CATALYST
[75] Inventor: Daniel S. Raden, Palatine, Ill.
[73] Assignee: Abbott Laboratories, North Chicago, Ill.
[22] Filed: Feb. 22, 1972
[21] Appl. No.: 228,237

[52] U.S. Cl. ............................. 252/426, 260/2.5 AC
[51] Int. Cl. ............................................ C08g 22/38
[58] Field of Search ................ 252/426; 260/2.5 AC

[56] References Cited
UNITED STATES PATENTS

| | | | |
|---|---|---|---|
| 2,866,803 | 12/1958 | De Pree | 252/426 X |
| 3,168,497 | 2/1965 | Twitchett | 260/2.5 AC X |
| 3,201,358 | 8/1965 | Hostettler et al. | 260/2.5 AC |
| 3,714,077 | 1/1973 | Cobbledick et al. | 260/2.5 AC X |
| 3,718,611 | 2/1973 | Maxey et al. | 252/426 X |

FOREIGN PATENTS OR APPLICATIONS 889,048   2/1962   Great Britain ...................... 252/426

OTHER PUBLICATIONS

"Tertiary Amine Catalysis," Burkus, J. Org. Chem., Vol. 26, pp. 779–782 (1961).

Primary Examiner—Patrick P. Garvin
Attorney, Agent, or Firm—Paul D. Burgauer; Robert L. Niblack

[57] ABSTRACT

A new catalyst for the acceleration of urethane polymerization consisting of a mixture of N,N-dimethyl-cyclohexyl-amine and N-methyl-dicyclohexylamine has been found. The new mixture has unique characteristics that are not expected from its components taken alone.

2 Claims, No Drawings

URETHANE CATALYST

DETAILED DESCRIPTION OF THE INVENTION

Polyurethane foams have been finding wider and wider uses in industry and it has been learned that the two major components, a polyisocyanate and a polyhydroxy compound, are not the only material which affect the ultimate properties of the formed polyurethane; the properties are also a function of the blowing agent, the reaction temperature and the catalyst used.

Numerous tertiary amines have been proposed as catalysts for this reaction and among them, there are those that produce desirable properties of the resulting foam even at a room temperature polymerization cure and post-cure. However, some of these catalysts are not well suited for certain fast, large-scale production runs because the required reaction speed is slower than desirable. Typical examples of widely used industrial catalysts of this type are N-methyl-dicyclohexylamine and N,N-dimethyl-cyclohexylamine.

It has now been found that against any expectation, a mixture of N-methyl-dicyclohexylamine and N,N-dimethyl-cyclohexylamine shows better cure, gellation and rise time than either of its components alone while at the same time the physical properties of the resulting foam are almost identical. It is therefore, the main object of this invention to provide a polyurethane catalyst that produces short cure, gel and rise times at room temperature or at moderately elevated temperatures.

This and other objects are accomplished by providing a mixture of N,N-dimethyl-cyclohexylamine and N-methyl-dicyclohexylamine within a ratio between 9:1 and 1:9. This mixture produces a tack-free time of a rigid or semi-rigid polyurethane foam that is as good as that of the faster component in the mixture while producing significantly shorter gel, cure and rise times than either component alone. A result of this kind is certainly unexpected when equivalent catalyst amounts are considered.

In order to illustrate the unexpected results obtained with the catalyst mixture of the present invention, reference is made to the following examples which are, however, not to be construed to limit the scope of this invention:

EXAMPLES

To a mixture of 100 parts of a polyol having a hydroxyl percentage of 14.5 (marketed as Voranol RN 490 by Dow Chemical Co.), 1.5 parts of a silicone-glycol copolymer surfactant (sold under the code of DC-195 by Dow-Corning Corporation), the polyurethane catalyst as indicated below and 36.6 parts of the blowing agent fluorotrichloromethane, is added 124.76 parts of a polymeric isocyanate having an isocyanate content of about 31 percent (sold as NCO-20 by Kaiser Chemical Co.). This mixture produces a rigid foam of a nominal density of 2 lbs./ft.$^3$. The mixture is stirred at 1,200 rpm. for 20 seconds and poured into a 1-gallon ice-cream container where it is allowed to rise freely and cure at room temperature. The various catalysts, their amounts and the results obtained are shown in the following table.

| Example | Amount and Catalyst | Rise Time (sec) | Gel Time (sec) | Cure Time (sec) | Density (lb/ft$^3$) |
|---|---|---|---|---|---|
| 1 | 1.6% A | 30 | 70 | 90 | 2.13 |
| 2 | 1.6% B | 33 | 75 | 95 | 2.16 |
| 3 | 1.2% A/B 3:1 | 32 | 65 | 90 | 2.13 |
| 4 | 1.6% A/B 3:1 | 27 | 55 | 75 | 2.10 |
| 5 | 1.6% A/B 1:1 | 27 | 60 | 80 | 2.08 |
| 6 | 1.6% A/B 1:3 | 28 | 60 | 80 | 2.11 |

A=N, N-dimethyl-cyclohexylamine
B=N-methyl-dicyclohexylamine

In these examples, the catalyst percentages are based on the weight of the total amount of polyol used in the foam-forming polymerization; all other part designations are based on parts by weight. Physical inspection shows the molded samples to be identical in feel, porosity and color.

While the above examples show the advantages in obtaining rigid polyurethane foams by using the catalyst mixture of the present invention, those skilled in the art will immediately recognize that other polyols and polyisocyanates may be used to replace those mentioned above to obtain other rigid, flexible or semi-rigid foams. Particularly suited are the polyisocyanates and polyols listed in U.S. Pat. No. 3,583,926 which specification also names a variety of suitable blowing agents. Preferred polyols are those which are based on the addition of 1,2-oxides to simple polyhydroxy compounds (such as glycerine, TMP, pentaerythritol, sucrose, sorbitol or the like) resulting in polyether polyols which together with a suitable polyisocyanate produce excellent foams by using the present catalyst. Of course, other surfactants may be used in place of the one mentioned above. These as well as stabilizers and other additives are well known in the trade but the use of the latter is not required since the new catalyst mixture is stable under normal storage conditions and suitable for combining with the polyol or the polyisocyanate well in advance of urethane manufacture.

When a polyol is selected for producing a flexible foam, the unexpected advantages of the present invention are apparent when the mixture of the disclosed catalyst contains as little as 10 percent by weight of N,N-dimethyl-cyclohexylamine while in formulations for making rigid foams, catalyst mixtures containing as little as 10 percent N-methyl-dicyclohexylamine shows the demonstrated improvement. When less than 10 percent of either component is present in the catalyst mixture, the advantages of using the mixture in place of the individual component are less apparent and are of no significant consequence in large scale industrial foam productions.

The new catalyst mixture is particularly advantageous when low catalyst amounts are desirable. Most commonly, the catalyst of this invention is used between 0.3 and 5 percent by weight, based on the weight of the polyol employed; however, excellent results are also obtained at catalyst levels as low as 0.1 percent; for instance:

A flexible foam is obtained by co-reacting a triol which has a molecular weight of about 3,000 and contains predominently secondary hydroxy groups (marketed under the code name of Voranol CP-3000), a silicone surfactant, a catalytic amount of stannous octoate a small amount of water and toluene diisocyanate (sold as Hylene TM by E. I. du Pont de Nemours, Inc.) which is an 80-20 percent weight mixture of 2,4-and 2,6-diisocyanatotoluene, using as little as 0.3 percent by weight of the new catalyst mixture described in Examples 3 and 4.

A highly resilient, flexible foam using 5 percent by weight of the above catalyst mixture is obtained from a polyol of molecular weight of about 6,500 having 50 percent or more primary hydroxy groups (marketed by Jefferson Chemical Co. under code name SF 6500) and a polyisocyanate of low viscosity based on diphenylmethane diisocyanate and having an isocyanate equivalent weight of about 133 and having a functionality of about 2.2 (marketed as PAPI-901 by the Upjohn Co.).

It will be obvious to those skilled in the art that the polyisocyanate or the polyol used could each be a mixture of components i.e., a mixture of polyols could be foamed with a mixture of polyisocyanates in a so-called one-shot foaming process. So-called "pre-polymer" processes can also be used. Whether a single polyisocyanate and a single polyol is used, each of these components could be at a temperature different from room temperature but usually neither component is employed at a temperature outside of the range of between 15° and 50°C.

It will also be apparent to those skilled in the art that co-catalysts may be used, particularly where specific properties of the resulting foam are desired. For instance, for certain rigid foams the use of a tin catalyst is often indicated desirable and is almost always indicated for making flexible foams. Examples of commonly used tin catalysts are well known in the art.

I claim:

1. A catalyst for making polyurethanes consisting essentially of N-methyl-dicyclohexylamine and N,N-dimethyl-cyclohexylamine in a ratio between 1:9 and 9:1 on a weight basis.

2. The catalyst of claim 1 wherein said ratio is between 1:3 and 3:1.

* * * * *